July 7, 1953 R. L. ANDREW 2,644,290
AUXILIARY ROLLER FOR LAWN MOWERS
Filed Dec. 28, 1951
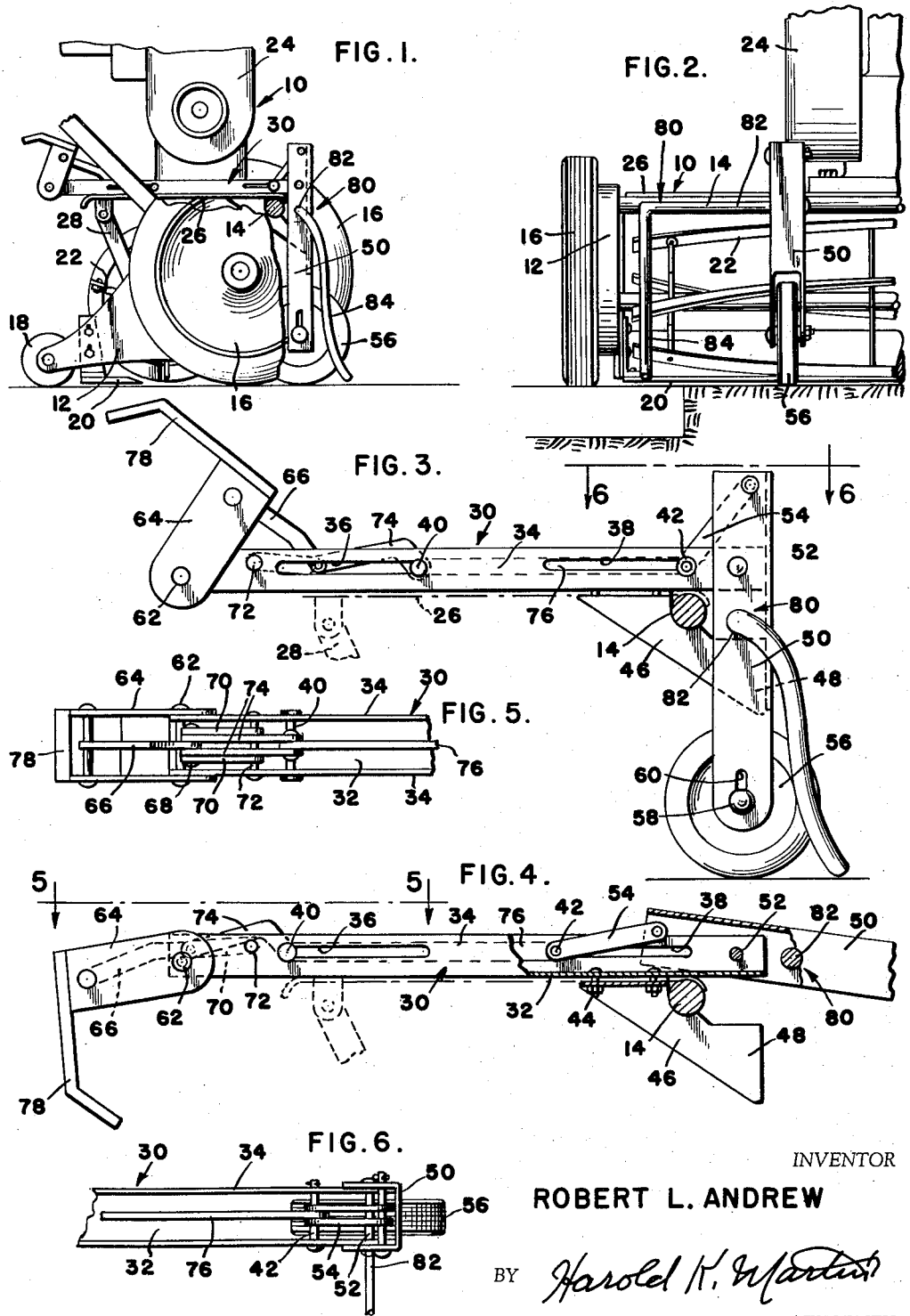
INVENTOR
ROBERT L. ANDREW
BY Harold K. Martin
ATTORNEY Patented July 7, 1953

2,644,290

UNITED STATES PATENT OFFICE 2,644,290

AUXILIARY ROLLER FOR LAWN MOWERS

Robert L. Andrew, Elmira, N. Y.

Application December 28, 1951, Serial No. 263,729

8 Claims. (Cl. 56—253)

This invention relates to a lawn mower and more particularly to an attachment for a lawn mower of the power driven type.

It frequently occurs that while cutting grass the lawn mower must be used adjacent flower beds and along lawn edges where there is no support for one of the wheels of the mower. When such a condition exists, particularly when using a power mower, there is usually a strip of uncut grass adjacent the edge of the lawn which is unsightly unless some other tool such as hand shears or a specially constructed lawn edge cutter is employed. This not only increases the amount of time and labor involved in trimming lawns but necessitates a capital investment in the necessary implements.

The primary object of this invention is to enable a lawn mower, and more particularly a power mower, to be used to trim grass clear to the edge of a lawn and to thus save the time, labor and investment occasioned by employing a tool or tools of another type.

Another object is to rapidly convert a lawn mower and particularly a power mower into an implement capable of trimming the grass of a lawn clear to the edge thereof.

The above and other objects may be attained by employing this invention which embodies among its features an elongated bar carried by the frame of a lawn mower above the cutting mechanism thereof and extending perpendicular to the shrub bar of the lawn mower, a leg pivotally connected to the bar adjacent the shrub bar for movement in an arcuate path from a substantially vertical position to a substantially horizontal position, a ground contacting wheel carried by the leg for movement therewith from a lowered ground contacting and lawn mower supporting position adjacent the cutting mechanism to an elevated position remote from the cutting mechanism, a lever pivotally carried by the bar remote from the leg for movement in an arcuate path, and means connected to the leg and to the lever for moving the leg in unison with the lever.

Other features include a foot treadle carried by the lever for movement therewith by which the user may actuate the leg to move the ground contacting roller into or out of lawn mower supporting position.

Still other features include a hook carried by the bar for engaging the shrub bar of the lawn mower and holding the bar to the shrub bar and a stop arm carried by the hook and projecting into the path of movement of the leg for arresting movement of the leg when the ground contacting wheel attains ground contacting and lawn mower supporting position.

In the drawings,

Fig. 1 is a fragmentary side view of a lawn mower showing this attachment in place and the ground contacting wheel in lawn mower supporting position, Fig. 2 is a fragmentary front view in elevation of the lawn mower illustrated in Fig. 1, Fig. 3 is an enlarged detail side view of the attachment, Fig. 4 is a fragmentary view similar to Fig. 3 showing the leg in ground wheel elevating position, portions being shown in section to more clearly illustrate certain details, Fig. 5 is a fragmentary plan view of the rear end of the attachment, and Fig. 6 is a fragmentary top plan view of the front end of the attachment.

Referring to the drawings in detail a lawn mower designated generally 10 comprises spaced frame members 12 which are joined by a transversely extending shrub bar 14 and carry ground wheels 16 which rotate adjacent opposite ends of the shrub bar 14 about a common axis which lies parallel with below and to the rear of the shrub bar. A ground roller 18 is mounted in and extends between the frame members and rotates about an axis which lies parallel with the common axis below and to the rear thereof. Any conventional grass cutting mechanism may be carried by the frame members between the shrub bar 14 and the ground roller 18 though for the purpose of illustration there is shown the conventional ledger blade 20 and reel 22. The reel 22 and ground wheels 16 may be driven in any conventional manner from a prime mover 24 which is mounted on a suitable plate or platform 26, one edge of which is supported on the shrub bar 14 while its opposite edge is supported on suitable brackets 28 carried by the frame members 12. The plate or platform 26 extends rearwardly from the shrub bar 14 above the grass cutting mechanism as will be readily understood upon reference to Figure 1. The structure so far described is conventional and forms no part of this invention.

This invention embodies an elongated bar 30 which is preferably of channel form in cross section and has a web 32 and spaced parallel longitudinally extending side flanges 34. Extending through the side flanges 34 adjacent opposite ends thereof are elongated longitudinal slots 36 and 38 which lie parallel to the web 32 and in which cross pins 40 and 42 are mounted to slide.

Secured by bolts 44 to the web 32 and partially embracing the shrub bar 14 of the lawn mower 10 is a hook 46 which lies beneath the plate 26 and carries a stop arm 48 which extends beneath the bar 30 and terminates in a vertical plane with the forward end thereof. A leg 50 is pivotally connected as at 52 intermediate its ends to the bar 30 adjacent the slots 38 for movement in an arcuate path from a vertical position against the stop arm to a substantially horizontal position as shown in Figures 3 and 4. An elongated link 54 is pivotally connected adjacent one end to the leg 50 adjacent the upper end thereof and said link is pivotally connected adjacent its opposite end to the cross pin 42 so that as the cross pin 42 moves longitudinally in the slots 38 away from the leg 50, the leg will move about the axis of the pivot 52 to the position shown in Figure 4. A ground contacting roller 56 is mounted in the leg 50 adjacent the lower end thereof for rotation about an axis which lies parallel with the common axis so that when the roller 56 is lowered as shown in Figure 3 it will have rolling contact with the ground. In the preferred form of the invention the axle 58 about the axis of which the roller 56 moves is mounted for adjustment longitudinally in slots 60 formed in the leg 50 so that the device may be used on mowers of different heights.

Pivotally connected as at 62 to the bar 30 adjacent the end thereof remote from the leg 50 is a lever 64 and pivotally connected to the lever 64 remote from the pivot 62 is a link 66 which carries remote from the lever a transversely extending pivot pin 68. Pivotally connected to the pivot pin 68 adjacent opposite ends thereof are locking links 70 which are pivotally connected remote from the link 66 to the bar 30 at 72. A pair of actuating links 74 are connected to the pivot pin 68 and to the cross pin 40 and connecting the cross pin 40 with the cross pin 42 is a tie link 76. As illustrated in Figures 3 and 4 the links 74 are bowed intermediate their ends so as to escape the pivot pin 72 when the leg 50 is in elevated position and the lever 64 is provided adjacent its end remote from the pivot 62 with a treadle member 78 which may be engaged by the foot of the operator of the lawn mower to move the leg 50 about its pivot 52 and the ground contacting roller 56 into or out of operative position. It is to be noted that the locking links 70 in moving about the axis of the pivot 72 pass beyond dead center so that the leg 50 will be positively held in either active or inactive position until positive effort is exerted on the lever 64 to move the linkage system.

Though not absolutely necessary in all instances when employing the invention I prefer to equip the attachment with a shrub guard designated generally 80 which is carried by the leg 50 for movement therewith from an active position adjacent a ground wheel 16 to an inactive postion in which it extends substantially horizontally. This guard 80 comprises a supporting arm 82 which is fixed to the leg 50 slightly below its pivotal connection to the bar 30 and extends laterally therefrom in substantially parallel relation to the shrub bar 14 toward an adjacent ground wheel 16. A guard arm 84 is fixed to the supporting arm 82 adjacent the ground wheel 16 for movement with the supporting arm and leg 50 in a vertical arcuate path adjacent the ground wheel 16 from an active position in which it extends substantially vertical to an inactive position in which it lies substantially horizontal.

In use when it is desired to trim a lawn adjacent the edge thereof, the operator simply engages the treadle 78 with his foot and moves the lever 64 about its pivot 62 into the position shown in Figure 3. Such movement will cause the cross pins 40 and 42 to move into the slots 36 and 38 and through the medium of the links 54 the leg 50 will be moved into vertical position against the stop arm 48. When the leg 50 is against the stop arm 48, the locking links 70 will extend toward the leg 50 and will have moved slightly beyond dead center so that any effort exerted on the leg 50 to move it into elevated position will be resisted by the locking links 70. With the leg 50 in its vertical position the ground contacting roller 56 will support the weight of the lawn mower 10 while an adjacent ground wheel 16 remains out of contact with the ground, thus enabling the grass adjacent the edge of a lawn to be cut. When it is desired to use the lawn mower in a conventional manner the lever 64 is moved to the position shown in Figure 4 thus swinging the locking links 70 about the axis of the pivot 72 to a position in which they extend away from the leg 50 and pass slightly beyond dead center so as to effectively support the ground contacting roller 56 in its elevated position.

When the shrub guard 80 is employed, it of course moves with the leg 50 so that the guard arm 84 will when in active position serve to brush aside bushes and similar growth in a flower bed or the like which might become drawn into the mowing mechanism and destroyed.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In a lawn mower of the type which includes an elongated frame, grass cutting mechanism carried by the frame intermediate the ends thereof, ground wheels carried by the frame adjacent opposite ends thereof for rotation in contact with the ground about a common axis, and a ground roller carried by the frame for rotation in contact with the ground about an axis spaced from and parallel with the common axis, means for supporting the cutting mechanism in grass cutting position when a ground wheel fails to contact the ground comprising an elongated bar carried by the frame above the cutting mechanism and in perpendicular relation to the common axis, a leg pivotally carried by the bar for movement in an arcuate path about an axis which lies parallel to the common axis, a ground contacting wheel carried by the leg for movement therewith in the arcuate path from a lowered frame supporting position adjacent the cutting mechanism to an elevated position remote from the cutting mechanism, a lever pivotally carried by the bar remote from the leg for movement about an axis which lies parallel to the common axis, and links carried by the bar and connected to the lever and to the leg for moving the leg in its arcuate path when the lever is moved about its pivot.

2. In a lawn mower of the type which includes an elongated frame, grass cutting mechanism carried by the frame intermediate the ends thereof, ground wheels carried by the frame adjacent opposite ends thereof for rotation in contact with the ground about a common axis, a shrub bar carried by the frame and extending longitudinally thereof above and parallel with the common axis, and a ground roller carried by the frame for rotation in contact with the ground about an axis spaced from and parallel with the common axis, means for supporting the cutting mechanism in grass cutting position when a ground wheel fails to contact the ground comprising an elongated bar carried by the frame above the cutting mechanism and in perpendicular relation to the common axis, a hook carried by the bar for engaging the shrub bar and holding the bar in position on said shrub bar, a leg pivotally connected to the bar adjacent the shrub bar for movement in an arcuate path from a substantially vertical position to a substantially horizontal position, a ground contacting wheel carried by the leg for movement therewith from a lowered ground contacting position to an elevated position clear of the ground, a lever pivotally carried by the bar remote from the leg for movement above the ground roller in an arcuate path from an elevated position to a lowered position, and means carried by the bar and operatively connected to the leg and to the lever for moving the ground contacting wheel in unison with the lever from a ground contacting position to an elevated position clear of the ground.

3. In a lawn mower of the type which includes an elongated frame, grass cutting mechanism carried by the frame intermediate the ends thereof, ground wheels carried by the frame adjacent opposite ends thereof for rotation in contact with the ground about a common axis, and a ground roller carried by the frame for rotation in contact with the ground about an axis spaced from and parallel with the common axis, means for supporting the cutting mechanism in grass cutting position when a ground wheel fails to contact the ground comprising an elongated bar carried by the frame above the cutting mechanism and in perpendicular relation to the common axis, a leg pivotally carried by the bar for movement in an arcuate path about an axis which lies parallel to the common axis, a ground contacting wheel carried by the leg for movement therewith in the arcuate path from a lowered frame supporting position adjacent the cutting mechanism to an elevated position remote from the cutting mechanism, a lever pivotally carried by the bar remote from the leg for movement about an axis which lies parallel to the common axis, links carried by the bar and connected to the lever and to the leg for moving the leg in its arcuate path when the lever is moved about its pivot, and a stop arm carried by the bar and projecting into the path of movement of the leg for arresting movement of the leg when the ground contacting wheel attains ground contacting position.

4. In a lawn mower of the type which includes an elongated frame, grass cutting mechanism carried by the frame intermediate the ends thereof, ground wheels carried by the frame adjacent opposite ends thereof for rotation in contact with the ground about a common axis, a shrub bar carried by the frame and extending longitudinally thereof above and parallel with the common axis, and a ground roller carried by the frame for rotation in contact with the ground about an axis spaced from and parallel with the common axis, means for supporting the cutting mechanism in grass cutting position when a ground wheel fails to contact the ground comprising an elongated bar carried by the frame above the cutting mechanism and in perpendicular relation to the common axis, a hook carried by the bar for engaging the shrub bar and holding the bar in position on said shrub bar, a leg pivotally connected to the bar adjacent the shrub bar for movement in an arcuate path from a substantially vertical position to a substantially horizontal position, a ground contacting wheel carried by the leg for movement therewith from a lowered ground contacting position to an elevated position clear of the ground, a lever pivotally carried by the bar remote from the leg for movement above the ground roller in an arcuate path from an elevated position to a lowered position, means carried by the bar and operatively connected to the leg and to the lever for moving the ground contacting wheel in unison with the lever from a ground contacting position to an elevated position clear of the ground, and a stop arm carried by the hook and projecting into the path of movement of the leg for arresting movement of the leg when the ground contacting wheel attains ground contacting position.

5. In a lawn mower of the type which includes an elongated frame, grass cutting mechanism carried by the frame intermediate the ends thereof, ground wheels carried by the frame adjacent opposite ends thereof for rotation in contact with the ground about a common axis, and a ground roller carried by the frame for rotation in contact with the ground about an axis spaced from and parallel with the common axis, means for supporting the cutting mechanism in grass cutting position when a ground wheel fails to contact the ground comprising an elongated bar carried by the frame above the cutting mechanism and in perpendicular relation to the common axis, a leg pivotally carried by the bar for movement in an arcuate path about an axis which lies parallel to the common axis, a ground contacting wheel carried by the leg for movement therewith in the arcuate path from a lowered frame supporting position adjacent the cutting mechanism to an elevated position remote from the cutting mechanism, a lever pivotally carried by the bar remote from the leg for movement about an axis which lies parallel to the common axis, longitudinally spaced parallel cross pins mounted on the bar to slide longitudinally thereof, a link connected to the cross pins for moving said cross pins in unison, a link connected to the leg and to an adjacent cross pin for moving the leg in its arcuate path when the cross pins are moved, and a pair of pivotally connected links connected to the opposite cross pins and to the lever for moving the cross pins in unison with the lever.

6. In a lawn mower of the type which includes an elongated frame, grass cutting mechanism carried by the frame intermediate the ends thereof, ground wheels carried by the frame adjacent opposite ends thereof for rotation in contact with the ground about a common axis, and a ground roller carried by the frame for rotation in contact with the ground about an axis spaced from and parallel with the common axis, means for supporting the cutting mechanism in grass cutting position when a ground wheel fails to contact the ground comprising an elongated bar carried by the frame above the cutting mechanism and in perpendicular relation to the common axis, a leg pivotally carried by the bar for movement in an arcuate path about an axis which lies parallel to the common axis, a ground contacting wheel carried by the leg for movement therewith in the arcuate path from a lowered frame supporting position adjacent the cutting mechanism to an elevated position remote from the cutting mechanism, a lever pivotally carried by the bar remote from the leg for movement about an axis which lies parallel to the common axis, links carried by the bar and connected to the lever and to the leg for moving the leg in its arcuate path when the lever is moved about its pivot, and a treadle carried by the lever and extending laterally therefrom for engagement by the foot of the operator of the lawn mower to shift the position of the ground contacting wheel.

7. In a lawn mower of the type comprising a pair of spaced frame members, ground wheels carried by the frame members for rotation in contact with the ground about a common axis, a shrub bar carried by the frame members and extending therebetween above and to one side of the common axis, a ground roller carried by the frame members for rotation therebetween below and to the side of the common axis remote from the shrub bar, a grass cutting mechanism carried by the frame members between the shrub bar and the ground roller, and a platform carried by the frame members and extending from the shrub bar toward the ground roller above the cutting mechanism, means to support the cutting mechanism in cutting relation to standing grass when a ground wheel fails to contact the ground comprising an elongated channel bar having parallel vertically extending side flanges secured to the platform and extending thereacross in perpendicular relation to the common axis, an elongated leg pivotally connected intermediate its ends to the channel member adjacent the shrub bar for movement in an arcuate path from a substantially vertical position to a substantially horizontal position, a ground wheel carried by the leg for movement therewith in the arcuate path from a ground contacting position adjacent the cutting mechanism to an elevated position remote from the cutting mechanism, a foot pedal carried by the channel member adjacent the end thereof remote from the leg for movement in a vertical arc from a position above the channel member to a position adjacent the adjacent end of the channel member and links connected to the foot pedal and to the leg for moving the ground wheel into and out of ground contacting position.

8. In a lawn mower of the type which includes an elongated frame, grass cutting mechanism carried by the frame intermediate the ends thereof, ground wheels carried by the frame adjacent opposite ends thereof for rotation in contact with the ground about a common axis, and a ground roller carried by the frame for rotation in contact with the ground about an axis spaced from and parallel with the common axis, means for supporting the cutting mechanism in grass cutting position when a ground wheel fails to contact the ground comprising an elongated bar carried by the frame above the cutting mechanism and in perpendicular relation to the common axis, a leg pivotally carried by the bar for movement in an arcuate path about an axis which lies parallel to the common axis, a ground contacting wheel carried by the leg for movement therewith in the arcuate path from a lowered frame supporting position adjacent the cutting mechanism to an elevated position remote from the cutting mechanism, a lever pivotally carried by the bar remote from the leg for movement about an axis which lies parallel to the common axis, links carried by the bar and connected to the lever and to the leg for moving the leg in its arcuate path when the lever is moved about its pivot, and a guard arm carried by the leg for movement thereby in a vertical arcuate path adjacent a ground wheel from a substantially horizontal inactive position to a substantially vertical active position in which it will brush aside growth which might be drawn into the mowing mechanism and destroyed.

ROBERT L. ANDREW.

References Cited in the file of this patent

UNITED STATES PATENTS

| Number | Name | Date |
|---|---|---|
| 2,546,279 | Stahl | Mar. 27, 1951 |
| 2,554,805 | Barton | May 29, 1951 |

FOREIGN PATENTS

| Number | Country | Date |
|---|---|---|
| 526,885 | Great Britain | Sept. 27, 1940 |